(No Model.) 4 Sheets—Sheet 1.

T. TRIPP.
ELECTRIC CAR TRUCK.

No. 457,802. Patented Aug. 18, 1891.

WITNESSES:
Walter L. Perry
J. Edward Porter

INVENTOR.
Thomas Tripp
BY
E. Frank Woodbury
ATTORNEY.

(No Model.) 4 Sheets—Sheet 2.
T. TRIPP.
ELECTRIC CAR TRUCK.
No. 457,802. Patented Aug. 18, 1891.
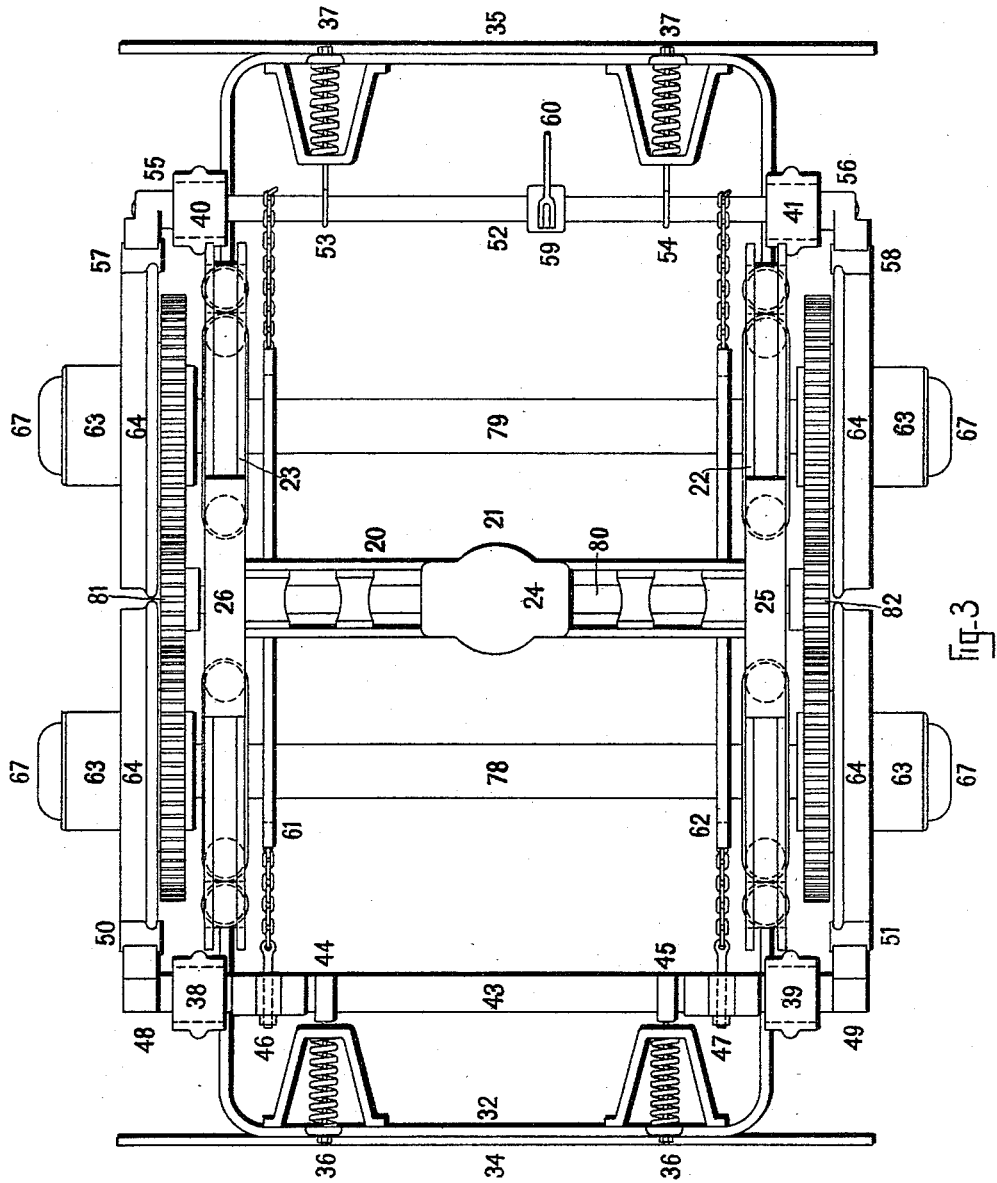
WITNESSES:
Walter L. Perry
J. Edward Porter
INVENTOR
Thomas Tripp.
BY
E. Frank Woodbury
ATTORNEY.

(No Model.) 4 Sheets—Sheet 3.

T. TRIPP.
ELECTRIC CAR TRUCK.

No. 457,802. Patented Aug. 18, 1891.

WITNESSES:
Walter C. Perry
J. Edward Porter

INVENTOR.
Thomas Tripp
BY
E. Frank Woodbury.
ATTORNEY.

(No Model.) 4 Sheets—Sheet 4.
T. TRIPP.
ELECTRIC CAR TRUCK.
No. 457,802. Patented Aug. 18, 1891.
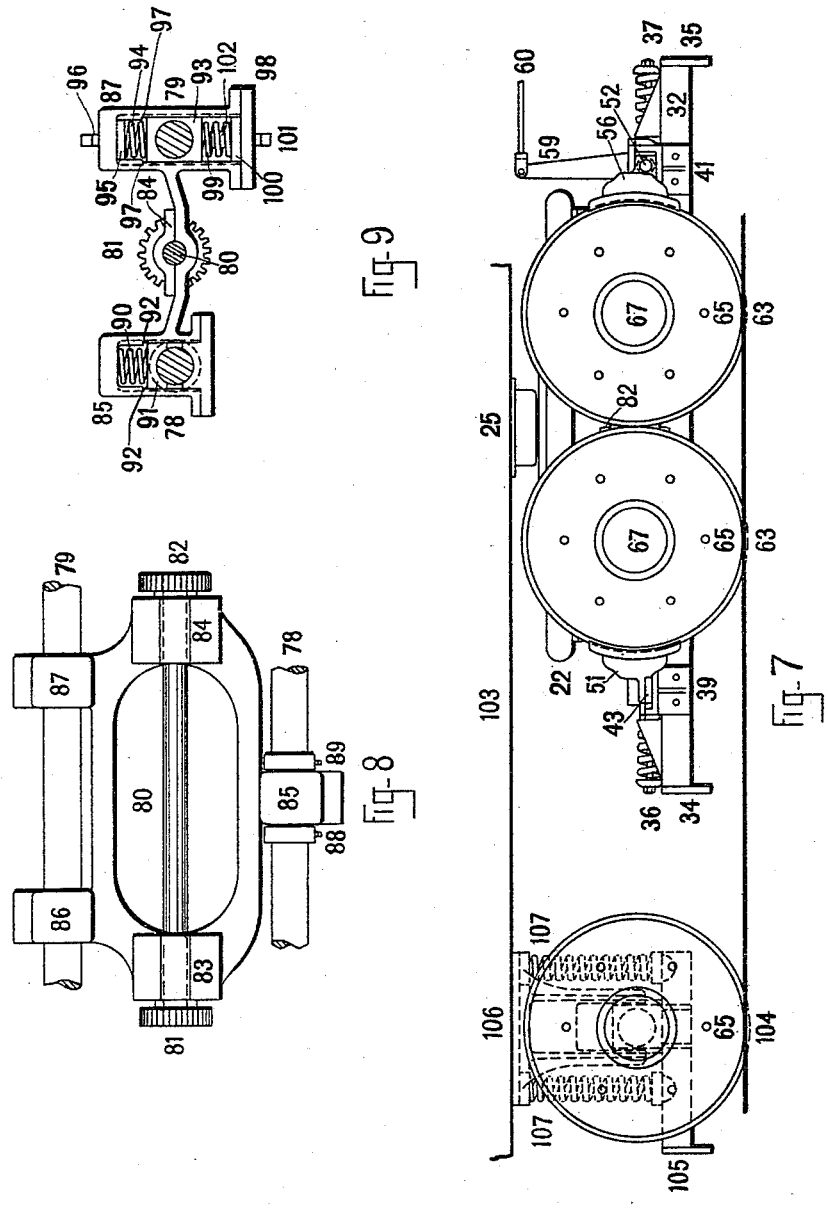
WITNESSES:
Walter L. Perry
J. Edward Porter
INVENTOR.
Thomas Tripp
BY
E. Frank Woodbury.
ATTORNEY.

UNITED STATES PATENT OFFICE.

THOMAS TRIPP, OF AVON, MASSACHUSETTS.

ELECTRIC CAR-TRUCK.

SPECIFICATION forming part of Letters Patent No. 457,802, dated August 18, 1891.

Application filed April 17, 1891. Serial No. 389,351. (No model.)

*To all whom it may concern:*

Be it known that I, THOMAS TRIPP, a citizen of the United States, residing at Avon, in the county of Norfolk and State of Massachusetts, have invented a new useful Electric Car-Truck, of which the following is a specification.

My invention relates to electric car-trucks designed for use under cars and the like adapted to be driven by power, especially electric power; and it has for its object, first, the direct transmission of electric power from the armature-shaft of the motor to the car-wheels, to which the power is applied at a point as near the wheel-treads as possible; second, the lessening of operative frictional resistance; third, a material reduction in the number of frictional bearings; fourth, the construction and arrangement of the "motor-frame" (so called) and the armature-shaft, which permit the easy and expeditious removal from the truck of the motor and the armature-shaft, and, fifth, the construction and arrangement of trucks to be used under six-wheel cars. These objects and many others I attain in the manner hereinafter set forth.

The principal object of my invention is to produce an electric truck that shall be very effective and durable, so constructed and arranged that all maintenance or renewal repairs can be readily and cheaply made.

Figure 1:
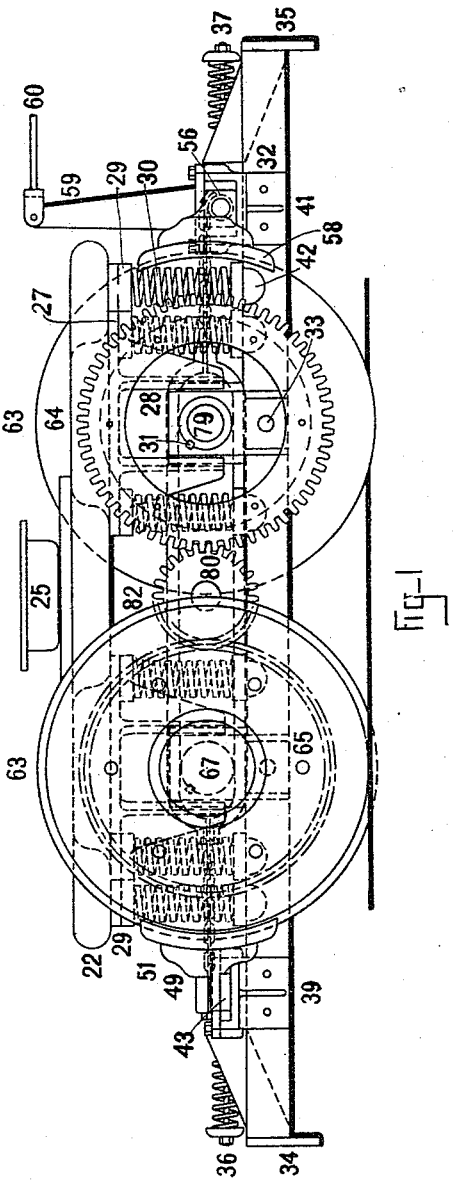
Figure 2:
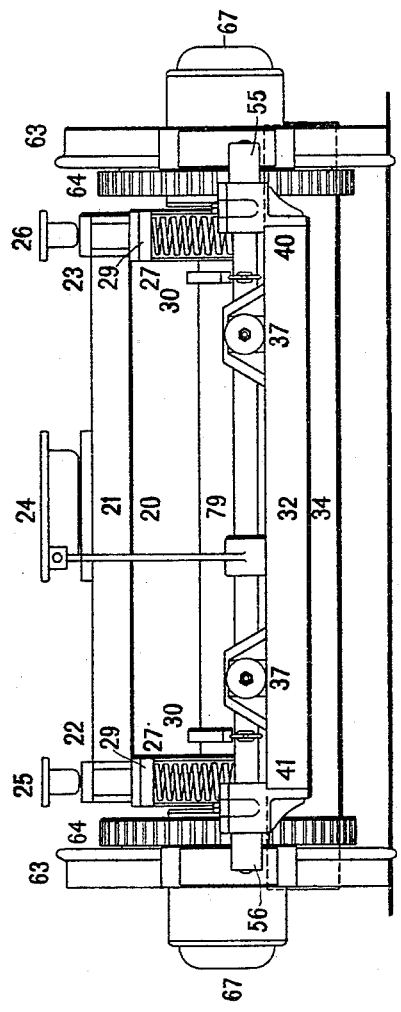
Figure 6:
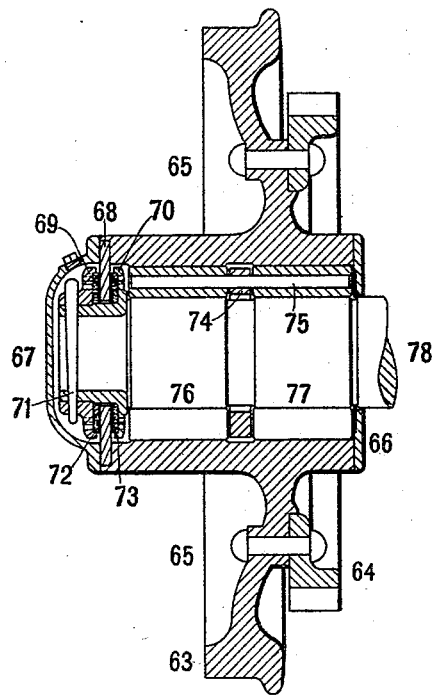
Figure 4:
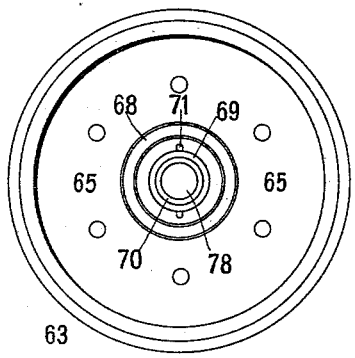
Figure 5:
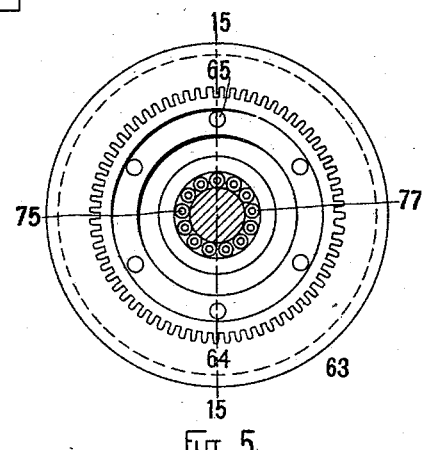

Figure 1 represents my double truck in side elevation with one of the wheels removed. Fig. 2 is an end elevation of Fig. 1 with one of the guards removed. Fig. 3 is a plan of Fig. 1. Fig. 4 is a front view of one of the wheels with the wheel-cap removed. Fig. 5 is a rear view of one of the wheels with the packing-plate removed, its axle being shown in section. Fig. 6 is a full vertical sectional view of Fig. 5 on line 15 15 upon an enlarged scale, the end of the axle being shown in elevation. Fig. 7 represents, on a reduced scale, my truck as applied to a six-wheel car. Fig. 8 represents in plan an outline view of an electric motor and armature-shaft frame with the driving-pinions mounted thereon as applied to the axles of the truck; and Fig. 9 is an end view or elevation of Fig. 8, the axles being represented in section and one of the collars removed.

The truck-bolster 20 consists of the center piece 21 and the side pieces 22 and 23. These pieces are made, preferably, of bar iron or steel, and they are provided with separating-spools and plates, as shown, the whole being firmly and rigidly united together in the usual manner by means of rivets or bolts. The center piece 21 is provided with the center plates 24, and the side pieces 22 and 23 are provided with the side bearings 25 and 26, respectively. Each side piece is provided with and has firmly secured thereto two pedestals, as 27, each pedestal being provided with two jaws within which the fixed axle-box 28 is free to move (or the jaws upon the box) in vertical lines, a slight horizontal movement being provided for by the looseness of the fit between the fixed box and the jaws of the pedestal. Each side piece is also provided with the spring-cups, firmly secured thereto, as 29, adapted to receive the upper end of the spiral springs, as 30. One spring for each spring-cup and six springs for each side piece are shown. Each fixed axle-box, as 28, is firmly secured to the axle, preferably by means of a key, as 31, as represented in Fig. 1, and each box is provided with a pendent portion to which the axle-box tie bar or equalizer 32 is fastened by means of a pin or bolt, as 33.

The axle-box tie-bar is held in its position by reason of its being fastened to the four axle-boxes. It is made endless, and it is provided with the following: guards 34 and 35, brake-beam springs 36 and 37, flat brake-beam holders 38 and 39, round brake-beam holders 40 and 41, and spiral-spring cups 42.

The flat brake-beam 43, which is free to reciprocate within the holders 38 and 39, is provided with the following: spiral-spring attachments 44 and 45, secondary brake-rod attachments 46 and 47, and brake-blocks 48 and 49, provided, respectively, with brake-shoes 50 and 51.

The round brake-beam 52, which is journaled in the rectangular portion of the brake-blocks, which portion is free to reciprocate within the brake-beam holders 40 and 41, is provided with the following: spiral-spring attachments 53 and 54, brake-blocks 55 and 56, having, respectively, the brake-shoes 57 and 58, and the brake-lever 59, which is adapted to be operated in the usual manner by means of the brake-rod 60.

The secondary brake-rods 61 and 62 are alike and each is provided with a yoke portion which straddles the axles, and one end of each rod is secured to the flat brake-beam, while the other end is fastened by means of a chain to the round brake-rod.

The wheels 63 are alike, and one of them is represented in detail by Figs. 4, 5, and 6, and it is constructed as follows: It is provided with the gear 64, securely fastened to the wheel by the rivets 65. To the back of the wheel-hub is fastened the oil and dust packing plate 66. To the front of the wheel-hub is fastened the wheel-cap 67, which firmly holds the thrust-plate 68 against the recessed portion of the wheel-hub. The thrust-plate collars 69 and 70 are fastened to the axle by means of the taper pin 71, and they are respectively provided with the anti-friction washers 72 and 73, made, preferably, of leatheroid. The roll-carrying ring 74 is provided with the set of roll-carrying pins 75, upon which are loosely mounted the two sets of anti-friction rolls 76 and 77, which are adapted to roll between the interior of the wheel-hub and the axle, each of which is supplied with the counterbores, as shown, for the purpose of preventing the formation of ridges by the rolls. Each end of each of the axles 78 and 79 is provided with a loose wheel in the manner as represented by Figs. 4, 5, and 6. The armature-shaft 80 is provided with the pinions 81 and 82, each of which is adapted to mesh with the gears of two wheels.

Figs. 8 and 9 are crude illustrations given to show the method of carrying the motor by the axles, by which method and arrangement the blows or jars of the wheels upon the tracks are absorbed or deadened before they reach the motor. The motor-frame is so constructed that by the removal of the journal-box caps 83 and 84 the armature-shaft may be lifted from the motor. The motor-frame is provided with the three bearing-boxes 85, 86, and 87. The box 85 is prevented from moving laterally upon the axle 78 by means of the collars 88 and 89 and it is constructed as follows: The spiral spring 90 is placed under tension between the box-frame and the half-sliding box 91, the sliding movement of which is limited by the stops 92 in the box-frame. The boxes 86 and 87 are alike and the box 87 is constructed as follows: The sliding box 93 is securely fastened to the axle 79. Between the top of the box and the frame is placed the spring 94, the tension of which may be regulated by the spring-cup 95 and the set-screw 96, and the upward-sliding movement is limited by the stops 97. Between the bottom of the box and the frame-cap 98 is placed the spring 99, the tension of which may be regulated by the spring-cup 100 and the set-screw 101, and the downward-sliding movement is limited by the stop 102, placed within the spring.

In the six-wheel-car-truck arrangement shown by Fig. 7 a portion of the car-body 103 is shown. Under one end of the car is placed the swiveling truck, as represented by Figs. 1, 2, and 3, and under the other end is placed the fixed truck 104, composed of a single axle, which is provided with the loose wheel, same as 65, and fixed axle-boxes, same as box 28. These boxes, which are provided with box tie-bar 105, are designed to operate within the jaws of the pedestals, which are rigidly fastened to the car-body, one of the pedestals, as 106, being shown. Springs, as 107, are placed between the pedestals and the tie-bar.

The operation of my electric car-truck is as follows: The armature-shaft is designed to transmit the power obtained from any suitable power-developer—such as an electric motor—by means of the pinions to the gears, which are secured to the wheels, thereby accomplishing the direct transmission of power from the armature-shaft of the motor to the car-wheels and applying the power as near the wheel-treads as possible. The lessening of operative frictional resistance is accomplished by the direct transmission of power and by the material reduction in the number of frictional bearings. The use of loose wheels, fixed axle-boxes, and non-rotative boxes for the motor-frame reduces the number of frictional bearings, compared with the usual construction, one-half.

The construction and arrangement of the truck are such as will permit the easy and expeditious removal of the motor, which may be secured to or made a part of the "motor-frame" (so called) and the armature. By jacking up a car in the usual manner the truck may be run out from under the car, and the truck-bolster, with its appendages, may be removed as one piece without starting a bolt or pin. Then the motor-frame is entirely uncovered, and by removing the two armature-shaft journal-box caps the armature-shaft may be readily removed, or by removing the caps to the motor-frame boxes the motor-frame may be expeditiously removed from the axles. Under short or six-wheel cars in many cases many of the advantages which might accrue by using two swiveling trucks may be more cheaply obtained by using one swiveling truck and one rigid truck, as represented in Fig. 7. If it is desired to have a radial truck, by using a pinion upon one end only of the armature-shaft this may be accomplished.

The use of spring-tension-fixed boxes for the motor-frame permits the easy riding or carrying of the motor by the axles, and, also, this construction allows the slight vertical differential movements of the two axles which occur in practice.

The brake-gear, which is extremely direct, simple, and effective, operates as follows:

When the power is applied to the round brake-beam by means of the brake rod and lever, the beam is forced to have an oscillating or slightly-rotating motion, which tends to shorten up the secondary brake-rods by the winding up of the chain ends of the rods upon the round brake-beam, and this shortening up of the rods draws the brake-beams together and forces the brake-shoes against the wheel-treads, and when the brakes are released the brake-beam springs immediately push the brake-beams apart and force the brake-shoes away from the wheel-treads. It will be noticed that the center lines of travel of brake-beams, secondary brake-rods, and brake-beam springs are in substantially the same horizontal plane, and that means are provided for the easy adjustment of the tension of the brake-beam springs and the length of the secondary brake-rods.

So far as my knowledge extends, all attempts to produce a practical loose wheel have failed; but it is believed that my loose wheel is thoroughly practical.

It has been repeatedly demonstrated that an anti-friction bearing properly constructed greatly reduces friction. Therefore in my loose wheel, as represented in detail by Figs. 4, 5, and 6, I have combined the following: Sets of rolls carried by a roll-carrying ring, and pins placed between the axle and the wheel-hub, the thrust-plate collars having washers which are securely fastened to the non-rotative axle, and the thrust-plate which is securely fastened to and rotates with the wheel-hub. This construction produces a wheel that is strong, durable, and effective. The gears are preferably cast separate from the wheels; but if it is thought desirable each wheel may have a gear cast on it as an integral part of the wheel. The centers of the wheels, gears, and pinions on each side of the truck are in the same horizontal plane, and the teeth of the gears and pinion are so constructed that efficiency of the gears and pinion will not be impaired by the slight vertical variations in operation of the axles.

What I claim as new, and desire to secure by Letters Patent, is—

1. In an electric truck, the axles provided with loose geared wheels, each wheel being provided with the roller-carrying ring, to which are secured the roll-carrying pins and the sets of rolls which are located between the wheel-hub and the axle, and the thrust-plate mechanism consisting of the thrust-plate, which is secured to the wheel and in operation rotates between the thrust-plate collars, which are firmly fastened to the axle, substantially as set forth.

2. An electric truck provided with non-rotative axles and loose geared wheels, each wheel being provided with an anti-friction bearing, and thrust-plate devices consisting of the thrust-plate secured to the wheel and the thrust-plate collars secured to the axle, each collar being provided with an anti-friction washer, substantially as set forth.

3. In an electric truck, a motor-frame provided with spring bearing-boxes and an armature-shaft, in combination with the non-rotative axles and loose wheels, substantially as described.

4. In an electric truck, a motor-frame provided with spring bearing-boxes having stops, and an armature-shaft provided with pinions, each pinion being adapted to mesh with and drive a set of two gears, each gear being secured to a loose wheel, substantially as and for the purposes set forth.

5. In an electric truck, a motor-frame provided with an armature-shaft having pinions mounted thereon, which are adapted to drive the geared loose wheels mounted on fixed axles, the motor-frame being provided with the spring non-rotative bearings having positive stops adapted to limit the spring movements of said bearings, substantially as described.

6. An electric truck comprising the non-rotative axles, which have mounted thereon geared loose wheels provided with anti-friction bearings, in combination with a single truck, the non-rotative axle of which has mounted thereon loose wheels provided with anti-friction bearings, substantially as described.

7. In an electric truck, the truck-bolster comprising the center piece, the side pieces, and the pedestals united together into one piece, so that it may be lifted from the truck, thereby completely uncovering the motor mounted upon the axles, substantially as and for the purposes set forth.

8. In an electric truck provided with geared loose wheels adapted to be driven by an armature-shaft provided with pinions, the fixed axle-boxes having fastened thereto the axle-box tie-bar, substantially as described.

9. In an electric truck provided with loose-geared anti-friction bearing-wheels, the axles provided with the fixed axle-boxes, to which is fastened the axle-box tie-bar, upon which are mounted the brake-beam holders and brake-beam springs, substantially as described.

10. In an electric truck, in combination, the truck-bolster and its pendent parts, the fixed axle-boxes provided with the axle-box tie-bar, the loose wheels provided with gears and anti-friction bearings, said wheels being directly driven by the armature-shaft, having pinions, substantially as described.

11. In an electric truck, in combination, the truck-bolster and its pendent parts constituting one piece, the axles provided with the fixed axle-boxes and axle-box tie-bar and having mounted thereon the loose wheels provided with anti-friction bearings, thrust-plate devices, and gears adapted to be driven by the armature-shaft, having pinions, substantially as described.

12. In an electric truck, the combination of the truck-bolster, fixed axles, fixed axle-boxes, and the loose-geared wheels having anti-friction bearings, and the thrust-plate mechanism, with the motor-frame provided with spring-bearing boxes and having the armature-shaft, each end of which has a pinion mounted thereon adapted to mesh with the gears, which are secured to or are a part of the wheels, substantially as and for the purpose set forth.

13. In an electric truck, the fixed axles operatively connected together, so as to be held in a state of parallelism, provided with geared loose wheels, said gears being driven by pinions mounted upon the armature-shaft of an electric motor, substantially as described.

In testimony whereof I have signed my name to this specification in the presence of two subscribing witnesses.

THOMAS TRIPP.

Witnesses:
CHARLES O. FARRAR,
WALTER L. PERRY.